United States Patent [19]

DeVos

[11] Patent Number: 4,710,292

[45] Date of Patent: Dec. 1, 1987

[54] DIGESTER TANK WITH FOAM CONTROL COVER

[75] Inventor: Jerry DeVos, Montville, N.J.

[73] Assignee: Atara Corporation, Quebec, Canada

[21] Appl. No.: 897,088

[22] Filed: Aug. 18, 1986

[51] Int. Cl.[4] ............................................. C02F 11/04
[52] U.S. Cl. .............................. 210/218; 210/DIG. 9; 210/539; 220/219; 220/227
[58] Field of Search ................. 210/218, 603, DIG. 9, 210/538, 539, 180, 188, 194; 220/219, 227

[56] References Cited

U.S. PATENT DOCUMENTS

| | | | |
|---|---|---|---|
| 2,541,090 | 2/1951 | Orr et al. | 220/219 |
| 3,535,236 | 10/1970 | Travis | 210/DIG. 9 |
| 4,034,887 | 7/1977 | Sherlock | 220/219 |
| 4,134,515 | 1/1979 | Hills et al. | 220/219 |
| 4,148,361 | 4/1979 | Christensen | 220/219 |
| 4,256,837 | 3/1981 | Fluri et al. | 210/DIG. 9 |
| 4,378,437 | 3/1983 | Cook | 210/DIG. 9 |
| 4,391,705 | 7/1983 | Cook et al. | 220/227 |
| 4,512,883 | 4/1985 | Thompson | 220/219 |

Primary Examiner—Benoit Castel
Attorney, Agent, or Firm—McAulay, Fields, Fisher, Goldstein & Nissen

[57] ABSTRACT

The invention relates to apparatus for carrying out mixed liquid, gas and solid phase reactions and is intended for use in sewage digestion tanks where the removal of sludge and foam from the tanks is required. A reactor vessel is provided which includes a floating cover vertically movably maintained within the vessel. A device for limiting gas pressure is connected to the vessel below the cover. A buoyancy chamber is provided which is supported by the cover and located therebelow and is intended to be at least partially immersed within the liquid in the vessel. A foam/sludge withdrawal opening is located below the uppermost portion of the buoyancy chamber and connects the interior of the vessel to the exterior. In a preferred embodiment, a ballast member is supported from the cover and extends from the roof to below the buoyancy member.

14 Claims, 4 Drawing Figures

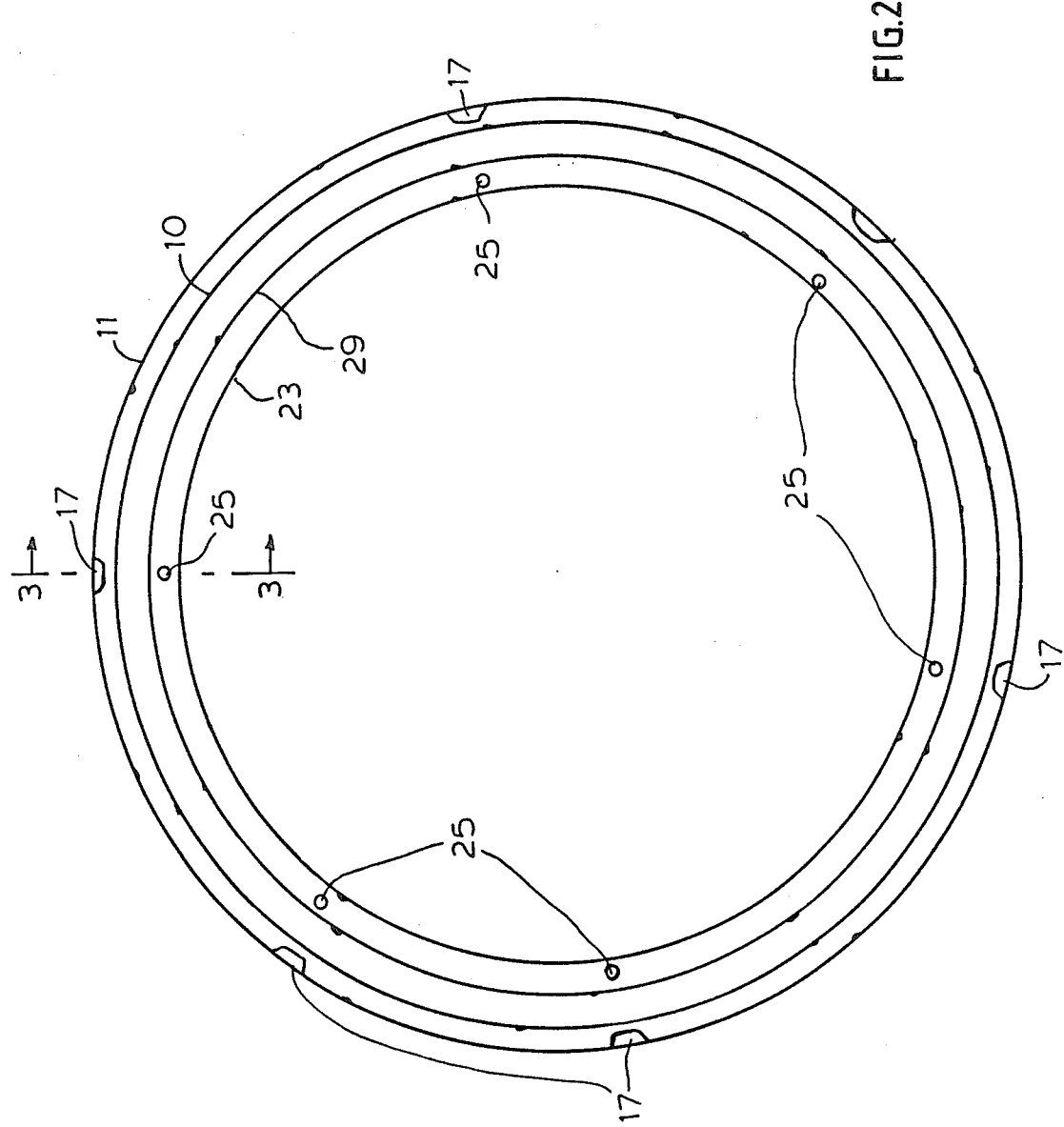

4,710,292

DIGESTER TANK WITH FOAM CONTROL COVER

This invention relates to apparatus for carrying out mixed liquid, gas and solid phase reactions, and especially reactions which tend to generate a layer of foam above the liquid surface. Most especially, this invention is intended for use in sewage digestion tanks where the removal of sludge and foam from the tanks is a serious problem.

BACKGROUND OF THE INVENTION

Large digestion tanks have long been used for the treatment of sewage to render the sewage innocuous and capable of being discharged into the environment without serious pollution problems. Most especially in anaerobic digestion processes, floating covers are used which float on the liquid surface, in order to force materials such as grease, scum and certain solids, which might otherwise float on the surface to be submerged, and thus more easily digested.

Recently developed processes combine sludge material generated by aerobic treatment systems as the feed material into anaerobic systems. Aerobic treatment systems are often associated with foam problems in anaerobic digestion. This foam, which has a specific gravity generally in the range of from 0.3 to 0.7, cannot support the floating roof at the same level as the liquid phase, which has a specific gravity of approximately 1. As a result of the formation of foam, and the problem of floating a cover on the foam, it has been found that the cover will sink down into the foam and the foam will extrude between the floating cover and the sidewalls of the digestion vessel. Any ga removal means, which are generally located at the top of the floating cover, will also tend to be clogged by the foam as it passes into the gas flow channels.

This problem of gas exhaust interruption is especially important where the floating cover is expected to float at least partially above the surface of the liquid, supported by a combination of the buoyancy effect of any submerged portions of the cover and an elevated gas pressure maintained between the roof member and the liquid surface. These types of covers require the continuous monitoring of gas pressure in order to maintain the roof at a desired location above the liquid; the gas exhaust ports thus should not be clogged by the foam which would interfere with gas pressure control.

Gas pressure-supported covers generally also have a weighted stabilizing member extending into the liquid in the vessel, where the weighted member is also partially supported by the buoyancy of the liquid.

SUMMARY OF THE INVENTION

It is an object of the present invention to provide means for maintaining a floating cover at a desired level above the liquid phase without interference by the formation of foam. It is a further object of this invention to provide means for withdrawing foam and/or sludge from the surface of a digestion pool having a floating cover supported at least in part by gas pressure.

In accordance with the present invention a reactor vessel intended for, e.g., sewage digestion, and comprising a sidewall and a bottom, a floating cover, vertically movably maintained within the vessel and extending transversely across the vessel; gas pressure limiting means connecting the vessel beneath the cover and the exterior of the vessel; and means for withdrawing liquid and other material from the vessel; is improved by providing a buoyancy chamber supported from the cover and located therebelow within the vessel and intended to be immersed, at least partially, within a liquid in the vessel; and variable level withdrawal means, supported from and moving with the cover, and defining a foam/sludge withdrawal opening located at a level below the uppermost portion of the buoyancy chamber and within the vessel, the opening connecting the interior of the reactor vessel to the exterior. Preferably, a ballast member is also supported from the cover and extends from the roof to below the buoyancy member. Most preferably, the ballast member is located within the reaction vessel below the buoyancy chamber.

In a preferred embodiment, the floating cover comprises in addition a skirt member extending axially downwardly below the cover and most preferably adjacent the sidewall of the reactor vessel. The ballast member is connected to and supported by the skirt portion and most preferably extends along the entire circumference of the skirt portion adjacent the reactor vessel wall. In a further preferred embodiment of this invention, the foam sludge withdrawal member extends substantially around the entire circumference of the skirt member adjacent the ballast member. The withdrawal member comprises a weir wall, most preferably, which is located radially inwardly from the ballast chamber and extends axially upwardly from the withdrawal opening; the ballast member is preferably located below the upper portion of the weir wall. The withdrawal opening is connected to a withdrawal pipe connected to the exterior of the digester vessel, permitting the removal of foam and sludge from the top surface of the liquid in the digester vessel, depending upon the vertical location of the weir wall.

In the preferred embodiment, the buoyancy chamber is also secured to and supported by the skirt portion and extends from the ballast member upwardly a desired distance. The upper end of the weir wall is located below the uppermost portion of the buoyancy chamber, such that the weir wall can be completely submerged below the surface of the liquid or foam when the upper portion of the buoyancy chamber remains exposed above the liquid surface.

The apparatus of this invention also comprises gas pressure means for limiting the gas pressure in the space below the roof member and above the liquid phase in the digester vessel.

In operation, sewage material is filled to a desired level within the digestion vessel by known means and preferably agitated or mixed, also by known means, such as by a large bubble generator as described in U.S. Pat. Nos. 4,181,263 and 4,293,506, by Lipert, or by other gas flow or mechanical mixing means. The level of the weir wall is set at a desired point at or above the level of the liquid, in order to remove all or only an upper portion of any foam or sludge collecting at the top of the liquid. The height of the weir wall with respect to the liquid level is determined by the height of the roof member, or cover, above the liquid.

The roof member is in turn supported by the sum of the upward force generated by the buoyancy chamber being submerged in the liquid and/or the foam, plus any buoyancy effect of the ballast chamber, to the extent it is submerged in the liquid, and the effect of gas pressure acting against the lower surface of the roof member. Thus, by increasing or decreasing the gas pressure, the height of the roof member and of the weir wall relative to the liquid can be varied. The effect of varying the gas pressure below the roof will cause the buoyancy chamber and the weir wall to move upwardly or downwardly relative to the foam/sludge interface and thus determine the foam level which is removed from the digester tank over the weir wall.

BRIEF DESCRIPTION OF THE DRAWINGS

The following drawings show preferred embodiments of this invention. These embodiments are intended to be exemplary only and are not to be taken as limiting of the scope of the invention.

In the drawings:

FIG. 2 is a top plan view above the digester tank of FIG. 1;

DESCRIPTION OF THE PREFERRED EMBODIMENTS

Figure 1:
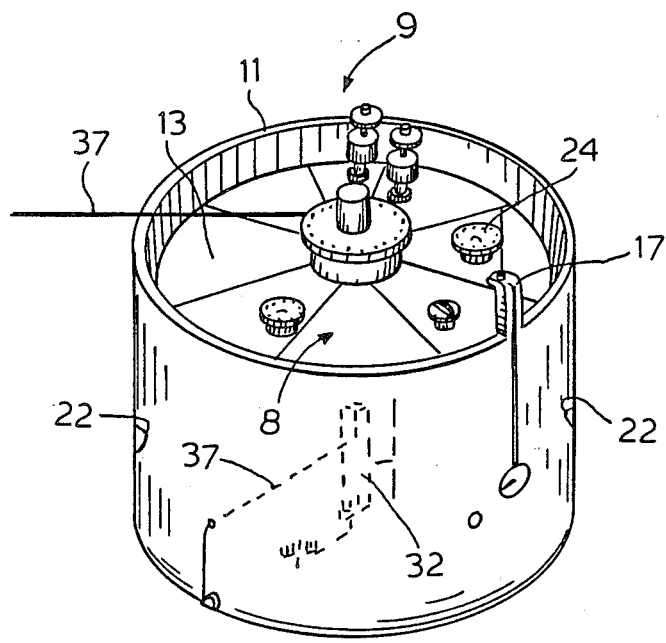
FIG. 1 is an isometric view of a digester tank in accordance with this invention.
Figure 4:
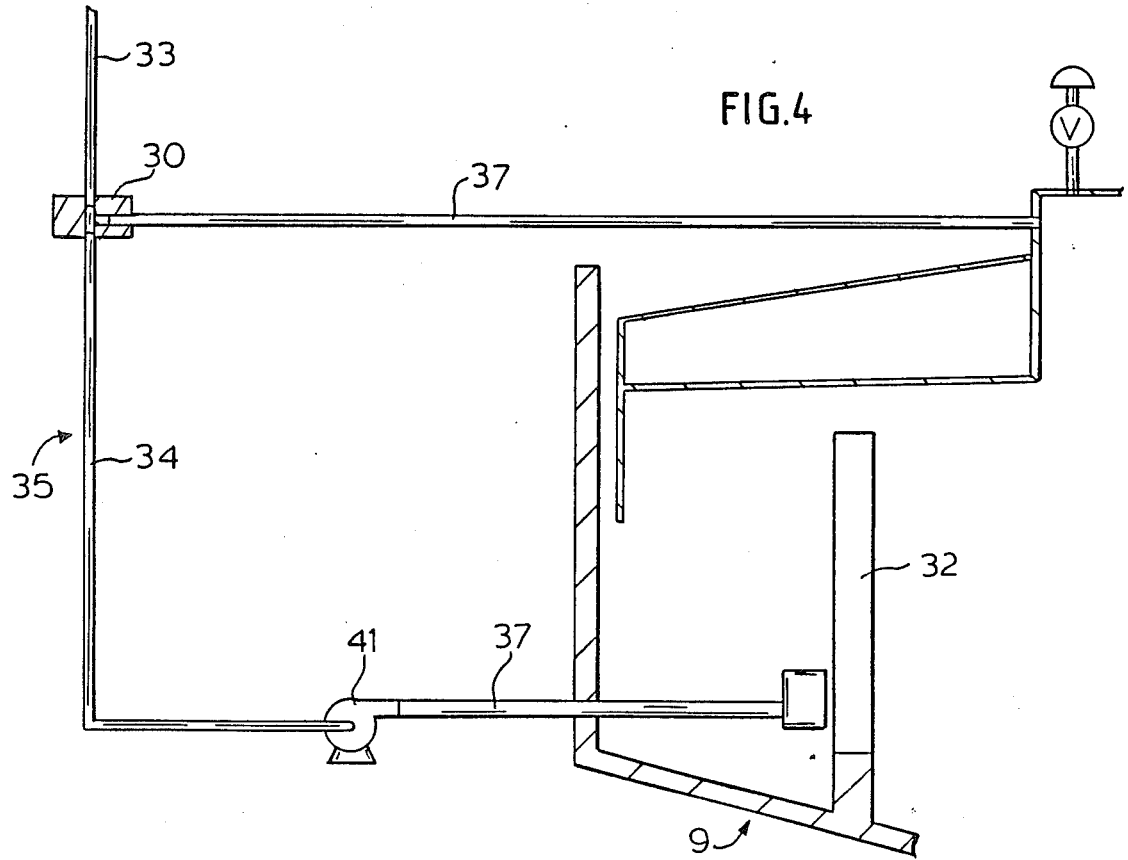
FIG. 4 is a schematic elevation view of the tank and the gas flow system.
Figure 3:
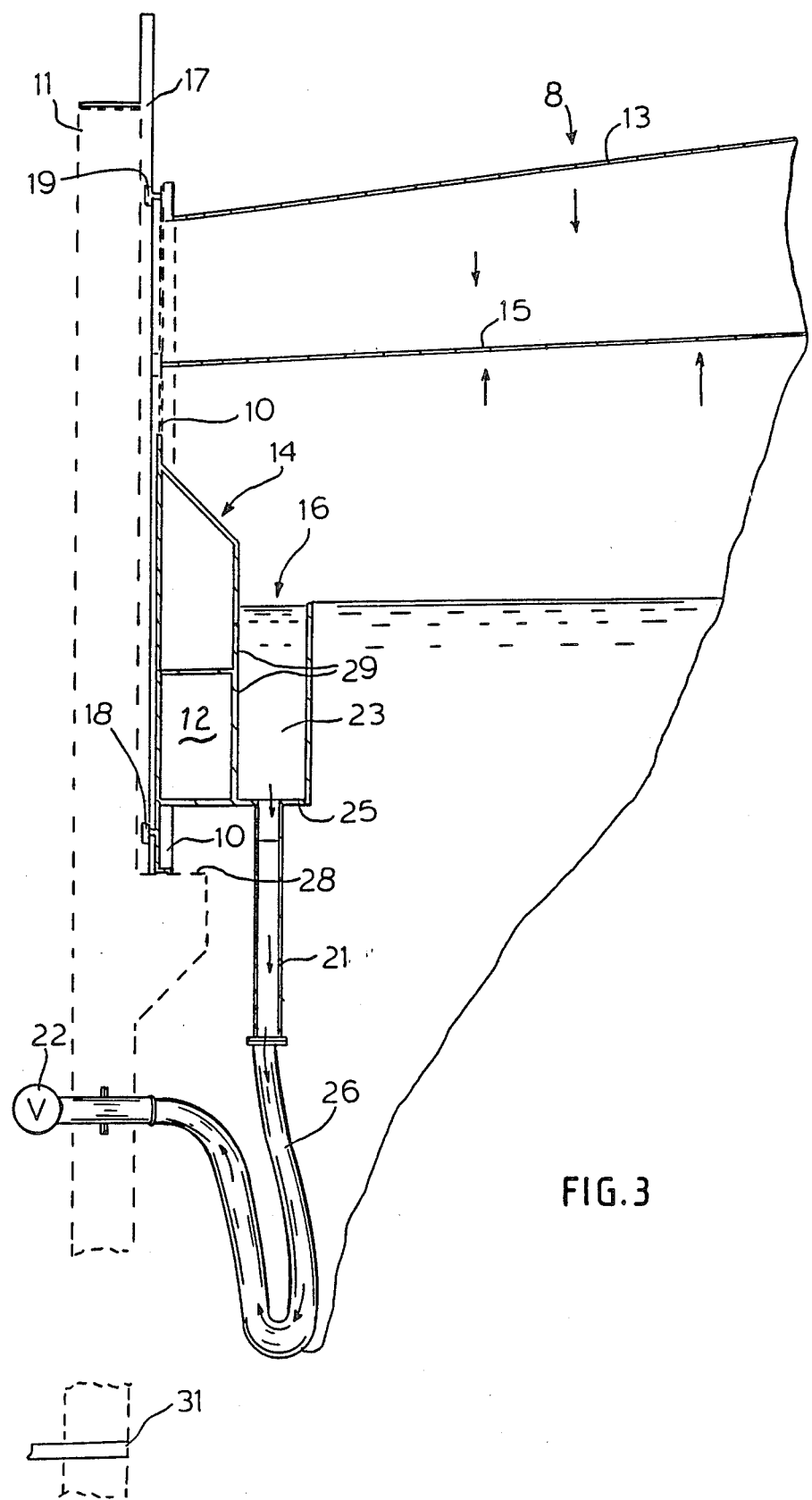
FIG. 3 is a partial cross-sectional view of the digester tank, taken along lines 3—3 of FIG. 2.

In the drawings, a process reaction tank, such as is commonly used in the digestion of sewage, generally indicated by the numeral 9, has an internal diameter in the range usually from 25 feet to 100 feet and a height in the range of 20 feet to 40 feet. The tank 9 is formed with a sidewall 11 and a bottom portion sealed to the sidewall 11, and is open at the top. In the present invention, a floating cover, generally indicated by the numeral 8, comprises a cover plate 13 extending transversely across the upper portion of the tank between the walls. A skirt 10 extends downwardly into the tank from the cover plate 13, generally adjacent to, and concentric with, the inner surface of the tank wall 11. The skirt 10 is secured and sealed at its upper edge to the outer circumference of the cover plate 13.

Vertical roller guides 17 are spaced around the inner circumference of the digester tank wall 11 and confine guide rollers 18 and 19, which are rotatably secured to the lower and upper portions of the skirt 10, respectively. These guide rollers 18, 19 combined within the guides 17 permit the floating cover 8 to freely move vertically within the tank while maintaining the cover 8 in a position substantially perpendicular to the axis of the tank.

Secured to the inner surface of the skirt 10, at a lower portion thereof, is a ballast member 12, extending around the entire circumference of the skirt. Secured to the inner surface of the skirt 10, immediately above the ballast 12, is a fluid-tight buoyancy chamber 14, also extending around the entire circumference of the skirt 10. The buoyancy chamber is filled with a gas, either air or preferably an inert gas such as nitrogen. There can be provided valve means for varying the buoyancy of the buoyancy chamber 14, e.g., by adding or removing water or other liquids, or gases.

Immediately radially inwardly of the ballast member 12 and buoyancy chamber 14 is a foam/sludge withdrawal trough 16, open at the top and defined by the outside surface 29 of the ballast 12 and buoyancy chamber 14 and a weir sidewall 23, which is substantially concentric with the skirt 10. The top edge of the weir wall 23 is located below the topmost portion of the buoyancy chamber 14. In this particular example, the weir wall 23 extends to approximately the midpoint, vertically, of the buoyancy chamber 14. The bottom wall 25 of the withdrawal trough 16 defines an opening connected to a foam/sludge withdrawal pipe 21 which extends downwardly, forming a siphon trap portion 26, and then extends upwardly and outwardly through the sidewall 11 of the digester tank 9. A sludge valve 22 can be provided at the outside surface of the digester tank 11 to permit regulating the liquid withdrawn from the withdrawal trough 16.

In this embodiment, the floating cover 8 comprises, in addition to the roofing plate 13, a lower optional ceiling plate 15 separated from the upper roofing plate by an enclosed space.

A pressure control valve 30 is connected on one side to the space below the cover 8 within the digester tank 9 and on the other sides to a gas exhaust conduit 33 (which can connect to a gas reservoir, not shown, for e.g. use as a fuel source), or to a mixing gas conduit 34 for recycle. The reservoir can provide for storage of the gas as a by-product and/or provide for recycling of the gas back through the mixing conduit 34.

The recycled gas in the mixing line 34 is passed through a recirculation compressor 41 and then via conduit 37 to, e.g., a large bubble generator-type mixer located at the bottom of the tank 9.

In digestion tanks smaller than a diameter of 30 feet centered near the bottom of the tank is a single large bubble generator mixer 32 of a type commonly used in the art, for example, as shown in U.S. Pat. No. 4,293,506. Multiple mixers are usually used in tanks larger than 30 feet in diameter. The mixer 32 is connected by the mixing gas conduit 37 to a gas flow system, indicated by the numeral 35, external of the tank, which includes the gas recirculation compressor 41. Gas is continually passed, when the mixer 32 is operating, from the interior of the tank 9, and then through the gas exhaust line 31, through the gas pressure control valve 30 to the compressor 41, and then to the mixer 32. Depending on the quantity of gas which is being passed and the quantity required by the mixer, either all of the gas is passed through the mixer or the total quantity is split between the mixer and an external reservoir, or an external utilization system, not shown.

The details of the valve 30, the compressor 41 and the mixer 32 are well known in the art and do not form a part of this invention. There is also preferably provided a safety release valve 24 to permit the immediate release of any catastrophic pressure increase.

As shown, the roller guides 17 are supported by the inner tank wall 11 and on a ledge or corbel 28, extending inwardly from the tank wall 11. The ledge or corbel 28 provides support for the floating cover when the tank is empty and acts as a lower stop member to restrict the movement of the floating cover 13, in normal operation.

Depending upon the diameter of the digester tank, there are between 4 and 12 roller guides 17 and between 2 and 12 foam/sludge withdrawal pipes 21, 26, 27 spaced substantially equally around the circumference of the tank.

One or more additional drain conduits 31, can be provided at the bottom of the tank to remove liquid.

In operation, the digester tank 9, for example, having an internal diameter of 40 feet and a total height of 30 feet, is maintained to a depth of 23 feet within the chamber with waste water and sewage, to serve as an anaerobic digester. A vertically movable, or floating, cover 13 is placed within the tank and initially rests upon support ledge 28 via the circumferential skirt 10. Four sets of rollers 18, 19 are secured to and are equally circumferentially spaced around the skirt 10 and are movably held within four roller guides 17 secured to the internal surface of the digester wall 11. The roller guides extend from the ledge 28, approximately 20 feet above the bottom of the tank, to a location 5 feet above the top of the tank wall 11. The guide rollers 18 and 19 can move vertically within the roller guides 17 but prevent rotation of the floating roof 13, either about the tank axis or perpendicular to the tank axis.

The ballast trough 12 is filled with concrete to a weight of 150 pounds per cubic feet. A total of 150 cubic feet of ballast is equally distributed around the circumference of the skirt 10, near its bottom. The ballast serves as a counterweight to stabilize the floating roof plate. Secured to the skirt immediately above the ballast trough 12 is the buoyancy chamber 14 which is filled with nitrogen gas. The buoyancy chamber 14 is 2.5 feet high along the skirt 10 and extends a distance of 1.0 foot radially inwardly from the skirt, having a total volume of 300 cubic feet. The weir wall 23 is spaced radially inwardly from the wall 29 of the buoyancy chamber 1.0 foot, concentric to the skirt 10. The weir wall 23 extends vertically from the bottom surface 25 a total of 2.0 feet.

In operation, sewage in the tank is digested, the chemical reaction generates methane gas which fills the area above the liquid and usually forms a foam above the level of the liquid. As the mass of gas in the area above the liquid increases, gradually the floating cover 13 is pushed upwardly. The height of the cover 13 above the liquid can thus be adjusted by removing or adding gas through the withdrawal pipe 31 as controlled by pressure relief valve 30. The combination of the buoyancy effect of the buoyancy chamber 14 and of the gas pressure within the tank serves to maintain the cover 13 at substantially any desired height above the liquid by setting the pressure control valve 30. The foam and any floating sludge are preferably removed through the withdrawal opening 25 as it passes over the top lip of the weir wall 23 and into the withdrawal trough 16; by controlling the height of the cover 8 above the liquid surface, the height of the weir wall 23 is controlled and thus whether only foam is withdrawn or foam plus liquid and any solid material floating above the liquid. If it is not desired to remove floating solid material floating from the liquid surface, a screen, or other exclusionary device, may be placed, e.g., at the top of the withdrawal trough 16, to exclude such material.

During the course of digestion, the mixer 32, particularly a large bubble generator, is operated using the gas generated from the digestion reaction; the gas is tapped from the gas exhaust line 31 by control valve 30 and directed to the gas recirculation compressor. This is especially important when an anaerobic reaction is taking place and the introduction of air is not desirable, and extremely dangerous.

Generally gases generated by a sewage digestion reaction include at least a majority of methane gas which can be collected for subsequent use outside of the tank.

Generally, the gas pressure beneath the cover and above the liquid is maintained in the range of between at least about 6 inches water and preferably 8 inches water up to about 12 inches of water above ambient, but generally not more than about 10 inches water.

In addition to the digestion of sewage, the apparatus of the invention can be used for the carrying out of a variety of liquid-gas phase chemical reactions, especially where foam and solid materials may also be present. The relative volumes and positions of the buoyancy chamber, ballast chamber and top of the weir wall can be so designed that at any given gas pressure the top of the weir wall is substantially at the top of the liquid layer. To the extent that the weir wall is desired to be submerged within the liquid, either gas pressure can be reduced or liquid can be fed into the buoyancy chamber. To the extent that it is desired to have the weir wall located above the liquid/foam interface, gas pressure within the tank below the floating cover can be increased, and/or liquid can be removed from the buoyancy tank. The invention thus provides a variety of means by which the level of the floating cover, and thus of the removal means, can be maintained at substantially any desired level within the tank.

I claim:

1. In apparatus for carrying out chemical reactions involving a liquid phase and a gas phase, wherein there is formation of foam above the liquid phase, the apparatus comprising a reactor vessel having an enclosed sidewall and bottom and designed to contain a liquid and a gas; a floating cover vertically movably maintained within the vessel and having a lower ceiling surface extending transversely across the vessel within the sidewall and designed to be supported above the level of liquid in the vessel; gas withdrawal conduit means located within the vessel and designed to permit the passage of gas between the vessel and the exterior of the vessel; and gas pressure controlling means for limiting the pressure below the floating cover within the vessel by controlling the flow of gas through the gas withdrawal conduit means;

the improvement which comprises a gas-filled buoyancy chamber rigidly connected to and located below the floating cover and within the vessel and designed to partially support the floating cover above liquid within the vessel; and a variable level liquid/foam withdrawal member, ridigly supported from and below the floating cover, and defining a withdrawal opening, located within the vessel and below the uppermost portion of the buoyancy chamber, and withdrawal conduit means connecting the withdrawal opening to the exterior of the vessel, to control the passage of foam and liquid between the vessel and its exterior; wherein the floating cover and the withdrawal opening, moving together, can be maintained at a desired height relative to the surface of the liquid so as to permit the removal of any proportion of foam and sludge floating on the surface of the liquid.

2. In the apparatus of claim 1, further comprising a liquid withdrawal member located within the vessel adjacent the bottom.

3. In the apparatus of claim 1, further comprising a ballast member supported from and extending below the floating cover.

4. In the apparatus of claim 3, wherein the ballast member is located within the vessel.

5. The apparatus of claim 4, comprising a skirt member extending axially downwardly from the floating cover and into the vessel, and wherein the ballast member, the buoyancy chamber and the liquid/foam withdrawal member are supported from the skirt member.

6. The apparatus of claim 5, wherein the ballast member is located within the vessel below the buoyancy chamber.

7. The apparatus of claim 1, further comprising cover support means, located within the vessel to limit the downward movement of the floating cover.

8. The apparatus of claim 1, wherein the gas withdrawal conduit means is located at and secured to the floating cover.

9. The apparatus of claim 8, wherein the gas pressure controlling means is secured to the floating cover.

10. The apparatus of claim 1, comprising liquid mixing means within the vessel.

11. The apparatus of claim 10, wherein the liquid mixing means comprises a gas lift system for generating liquid flow within the tank, and fluid flow conduit means between the mixing means and the gas withdrawal conduit means, such that gas from the vessel provides the gas lift.

12. The apparatus of claim 11, wherein the gas lift system comprises a large bubble generator.

13. The apparatus of claim 1, comprising liquid flow control means for adding liquid to and removing liquid from the buoyancy chamber, whereby the height of the cover above the liquid within the tank can be varied.

14. The apparatus of claim 1, wherein the liquid/foam withdrawal member comprises a vertically extending weir wall.

* * * * *